US012666167B2

(12) United States Patent
Emanuel et al.

(10) Patent No.: US 12,666,167 B2
(45) Date of Patent: Jun. 23, 2026

(54) SYSTEM AND METHOD FOR MULTISPECTRAL EXTRACTION FROM CROSSTALK PROFILE

(71) Applicant: SAMSUNG ELECTRONICS CO., LTD., Suwon-si (KR)

(72) Inventors: Rivka Emanuel, Tel-Aviv (IL); Gal Bitan, Tel-Aviv (IL); Elad Yaakobi, Tel-Aviv (IL); Elena Grechikhin, Tel-Aviv (IL); Shahaf Duenyas, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 18/602,814

(22) Filed: Mar. 12, 2024

(65) Prior Publication Data

US 2025/0294261 A1     Sep. 18, 2025

(51) Int. Cl.
| | |
|---|---|
| *H04N 25/13* | (2023.01) |
| *H04N 23/85* | (2023.01) |
| *H04N 25/62* | (2023.01) |

(52) U.S. Cl.
CPC ........... *H04N 25/134* (2023.01); *H04N 23/85* (2023.01); *H04N 25/62* (2023.01)

(58) Field of Classification Search
CPC ....... H04N 25/134; H04N 23/85; H04N 25/62
USPC ...................................................... 348/222.1
See application file for complete search history.

(56) References Cited

U.S. PATENT DOCUMENTS

| | | | |
|---|---|---|---|
| 9,792,668 | B2 | 10/2017 | Korkin |
| 10,739,189 | B2 | 8/2020 | Pacala et al. |
| 10,785,422 | B2 | 9/2020 | Ortiz Egea et al. |
| 11,368,603 | B2 | 6/2022 | Kato |

(Continued)

FOREIGN PATENT DOCUMENTS

| | | | |
|---|---|---|---|
| CN | 107239781 | A | 10/2017 |
| KR | 20160034897 | * | 3/2016 |
| WO | 2017/066825 | A1 | 4/2017 |

(Continued)

OTHER PUBLICATIONS

Boaz Arad et al., "Hyperspectral Recovery from RGB", (2016) V81, EMVA-YPA, The Interdisciplinary Computational Vision Laboratory, Ben-Gurion University of the Negev, 19 pages.

(Continued)

*Primary Examiner* — Joel W Fosselman
(74) *Attorney, Agent, or Firm* — Sughrue Mion, PLLC

(57) ABSTRACT

An electronic device includes: memory; a color filter array (CFA); an image sensor operatively connected to the CFA, the image sensor being configured to capture a plurality of images respectively having a plurality of measured spectral densities in a plurality of spectral bands; and a processor operatively connected to the at least one memory and the image sensor, wherein the at least one processor is configured to: measure a plurality of crosstalk values in a plurality of pixels and in a plurality of K channels of the plurality of images (the K represents a number of pixels per a color of the CFA), estimate a plurality of spectral-crosstalk values by applying an estimation function to the plurality of crosstalk values, and control to store, in at least one of the memory, the image sensor, or the processor, the estimated plurality of spectral-crosstalk values.

12 Claims, 7 Drawing Sheets

(56) References Cited

U.S. PATENT DOCUMENTS

| | | |
|---|---|---|
| 11,443,550 B2 | 9/2022 | Ren et al. |
| 2023/0332954 A1 | 10/2023 | Lee et al. |

FOREIGN PATENT DOCUMENTS

| | | |
|---|---|---|
| WO | 2018/047171 A1 | 3/2018 |
| WO | 2022/123047 A1 | 6/2022 |

OTHER PUBLICATIONS

Naveed Akhtar et al., "Hyperspectral recovery from RGB images using Gaussian Processes", Journal of LaTeX Class Files, vol. 14, No. 8, Aug. 2015, 15 pages, arXiv:1801.04654v2 [cs.CV] (Jul. 20, 2018).

Dilip K. Prasad et al., "Quick Approximation of Camera's Spectral Response from Casual Lighting", 2013 IEEE International Conference on Computer Vision Workshops, pp. 844-851, DOI: 10.1109/ICCVW.2013.116.

Yi-Tun Lin et al., "Physically Plausible Spectral Reconstruction from RGB Images", 2020 IEEE/CVF Conference on Computer Vision and Pattern Recognition Workshops (CVPRW), pp. 2257-2266, DOI: 10.1109/CVPRW50498.2020.00274.

Radovan Slavuj et al., "To develop a method of estimating spectral reflectance from camera RGB values", 2013 Colour and Visual Computing Symposium (CVCS), 6 pages, DOI: 10.1109/CVCS.2013.6626288.

Zhiyu Zhu et al., "Deep Amended Gradient Descent for Efficient Spectral Reconstruction from Single RGB Images", 12 pages, arXiv:2108.05547v1 [eess.IV] (Aug. 12, 2021).

Berk Kaya et al., "Towards Spectral Estimation from a Single RGB Image in the Wild", 10 pages, arXiv:1812.00805v1 [cs.CV] (Dec. 3, 2018).

Pai Chet Ng et al., "Efficient Hyperspectral Reconstruction from RGB Images with Line-Pixel Deconvolution", 2022 IEEE 14th Image, Video, and Multidimensional Signal Processing Workshop (IVMSP), 5 pages, DOI: 10.1109/IVMSP54334.2022.9816227.

Nishchal Jagadeesha et al., "Skin Tone Assessment Using Hyperspectral Reconstruction from RGB Image", 2023 15th International Conference on COMmunication Systems & NETworkS (COMSNETS), pp. 125-128, DOI: 10.1109/COMSNETS56262.2023.10041398.

Emmanuel Martinez et al., "Efficient Transfer Learning for Spectral Image Reconstruction from RGB Images", 2020 IEEE Colombian Conference on Applications of Computational Intelligence (IEEE ColCACI 2020), 6 pages, DOI: 10.1109/ColCACI50549.2020.9247895.

Yuqi Li et al., "Locally Linear Embedded Sparse Coding for Spectral Reconstruction From RGB Images", IEEE Signal Processing Letters, vol. 25, No. 3, Mar. 2018 (published Nov. 21, 2017), pp. 363-367, DOI: 10.1109/LSP.2017.2776167.

Hui Ding et al., "Smartphone based multispectral imager and its potential for point-of-care testing", Analyst, 2019, vol. 144, No. 14, pp. 4380-4385, DOI: 10.1039/c9an00853e.

Annemarie McCarthy et al., "Low-Cost Multispectral Imager", American Chemical Society, 2020, vol. 97, No. 10, pp. 3892-3898, DOI: 10.1021/acs.jchemed.0c00407.

Sewoong Kim et al., "Smartphone-based multispectral imaging and machine-learning based analysis for discrimination between seborrheic dermatitis and psoriasis on the scalp", Biomedical Optics Express, 2019, vol. 10, No. 2, pp. 879-891, DOI: 10.1364/BOE.10.000879.

Manu Parmar et al., "Selection of Optimal Spectral Sensitivity Functions for Color Filter Arrays", IEEE Transactions on Image Processing, vol. 19, No. 12, 2010, Presented by Ji-Hoon Yoo from Color & Imaging Lab., Kyungpook National University (35 pages).

* cited by examiner

TETRA PIXEL

NONA PIXEL

QUAD BAYER

| BLUE | | | GREEN | | |
|---|---|---|---|---|---|
| 525 | 672 | 539 | 477 | 375 | 478 |
| 663 | 928 | 658 | 664 | 463 | 664 |
| 542 | 642 | 533 | 471 | 375 | 495 |
| 472 | 632 | 468 | 267 | 183 | 277 |
| 392 | 439 | 376 | 178 | 136 | 178 |
| 483 | 643 | 435 | 254 | 175 | 254 |
| GREEN | | | RED | | |

PIXEL CROSSTALK IN NONA CFA PATTERN

FOR SAME SIGNAL ⬆

| R2 | R5 | R8 | GB 2 | GB 5 | GB 8 |
|---|---|---|---|---|---|
| R1 | R4 | R7 | GB 1 | GB 4 | GB 7 |
| R0 | R3 | R6 | GB 0 | GB 3 | GB 6 |
| GR 2 | GR 5 | GR 8 | B2 | B5 | B8 |
| GR 1 | GR 4 | GR 7 | B1 | B4 | B7 |
| GR 0 | GR 3 | GR 6 | B0 | B3 | B6 |

NONA PIXEL

FIG. 3

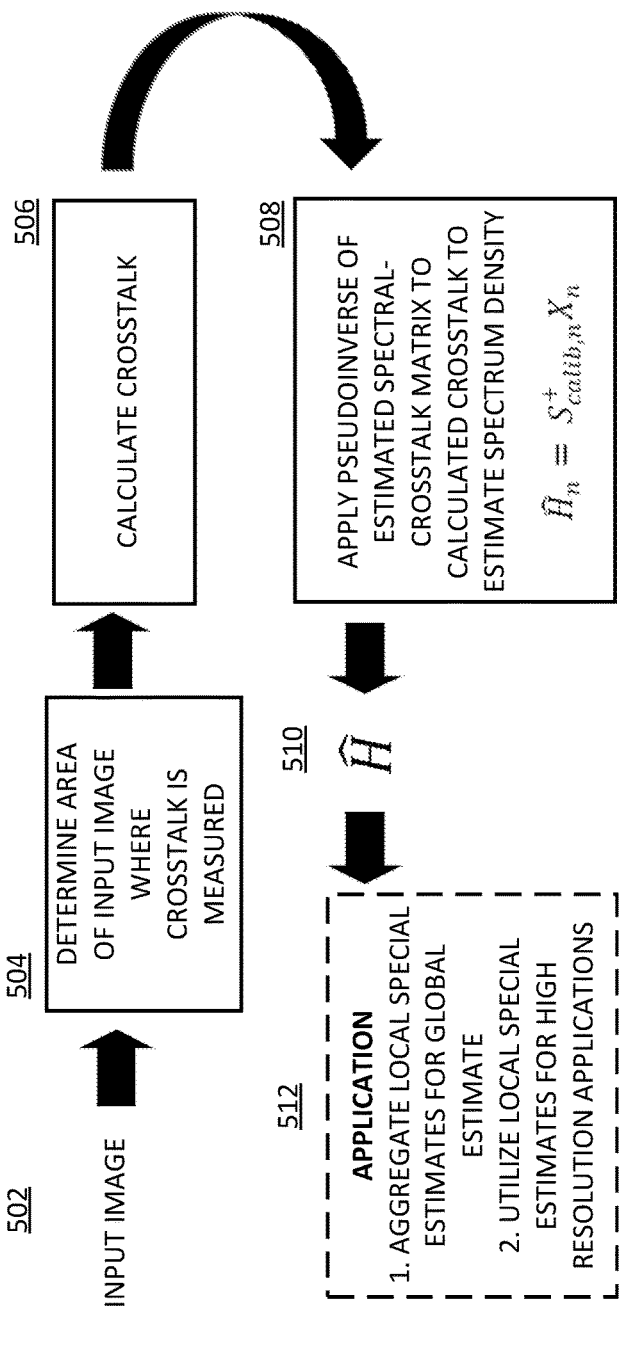

500 ONLINE SPECTRAL RECONSTRUCTION

502 INPUT IMAGE

504 DETERMINE AREA OF INPUT IMAGE WHERE CROSSTALK IS MEASURED

506 CALCULATE CROSSTALK

508 APPLY PSEUDOINVERSE OF ESTIMATED SPECTRAL-CROSSTALK MATRIX TO CALCULATED CROSSTALK TO ESTIMATE SPECTRUM DENSITY $$\hat{H}_n = S_{calib,n}^+ X_n$$

510 $\hat{H}$

512 APPLICATION
1. AGGREGATE LOCAL SPECIAL ESTIMATES FOR GLOBAL ESTIMATE
2. UTILIZE LOCAL SPECIAL ESTIMATES FOR HIGH RESOLUTION APPLICATIONS

FIG. 5

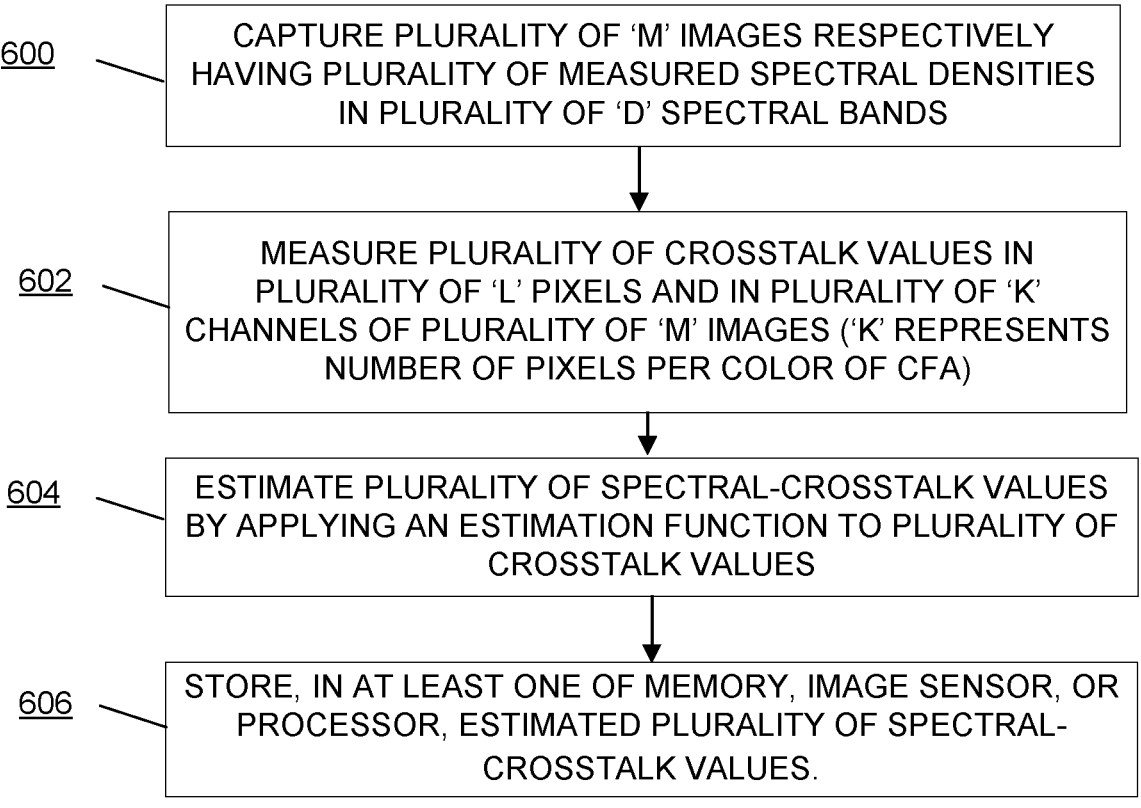

600     CAPTURE PLURALITY OF 'M' IMAGES RESPECTIVELY HAVING PLURALITY OF MEASURED SPECTRAL DENSITIES IN PLURALITY OF 'D' SPECTRAL BANDS

602     MEASURE PLURALITY OF CROSSTALK VALUES IN PLURALITY OF 'L' PIXELS AND IN PLURALITY OF 'K' CHANNELS OF PLURALITY OF 'M' IMAGES ('K' REPRESENTS NUMBER OF PIXELS PER COLOR OF CFA)

604     ESTIMATE PLURALITY OF SPECTRAL-CROSSTALK VALUES BY APPLYING AN ESTIMATION FUNCTION TO PLURALITY OF CROSSTALK VALUES

606     STORE, IN AT LEAST ONE OF MEMORY, IMAGE SENSOR, OR PROCESSOR, ESTIMATED PLURALITY OF SPECTRAL-CROSSTALK VALUES.

FIG. 6

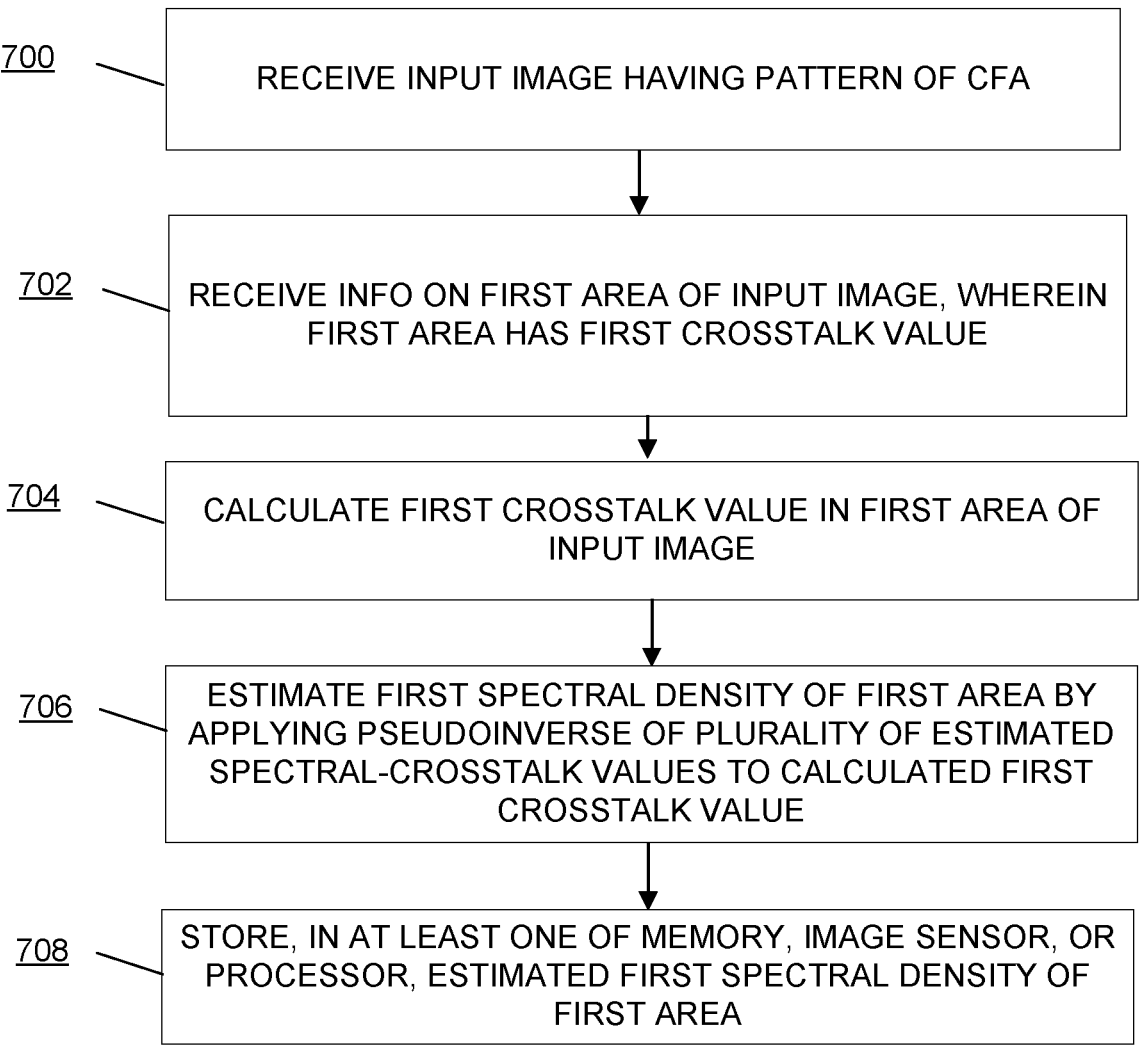

700 — RECEIVE INPUT IMAGE HAVING PATTERN OF CFA

702 — RECEIVE INFO ON FIRST AREA OF INPUT IMAGE, WHEREIN FIRST AREA HAS FIRST CROSSTALK VALUE

704 — CALCULATE FIRST CROSSTALK VALUE IN FIRST AREA OF INPUT IMAGE

706 — ESTIMATE FIRST SPECTRAL DENSITY OF FIRST AREA BY APPLYING PSEUDOINVERSE OF PLURALITY OF ESTIMATED SPECTRAL-CROSSTALK VALUES TO CALCULATED FIRST CROSSTALK VALUE

708 — STORE, IN AT LEAST ONE OF MEMORY, IMAGE SENSOR, OR PROCESSOR, ESTIMATED FIRST SPECTRAL DENSITY OF FIRST AREA

FIG. 7

SYSTEM AND METHOD FOR MULTISPECTRAL EXTRACTION FROM CROSSTALK PROFILE

BACKGROUND

1. Field

The disclosure relates to a system and a method for multispectral extraction from crosstalk profile, for example, in the fields of spectral imaging of image sensors.

2. Description of Related Art

Image sensors are widely used in digital still cameras, cellular phones, security cameras, medical, automobile, and other applications. Complementary metal-oxide-semiconductor ("CMOS") technology is used to manufacture low-cost image sensors on silicon substrates.

Most image sensors include a two-dimensional array of pixels that are used to capture images. Color image sensors are configured to assign color to each pixel in the pixel array using a color filter array ("CFA") coupled to the pixel array. The particular pattern of colors in the color filter array i.e., the colors used and the way they are arranged within the filter array, can improve the quality of the color image captured by the pixel array.

Spectral imaging deals with extraction of spectral power distribution from different parts of the image. Each frame of a three-dimensional (3D) image (resulted in the spectral imaging) has dimensions that are a height, a width, and a wavelength. Values of pixels in the frame correspond to the intensity (or relative intensity) in that specific Field-of-View (FoV) and spectral band represented by the pixels.

On the other hand, high resolution image sensors are mainly focused in generating two-dimensional (2D) images with predesignated color per pixel (e.g., Red, Green, and Blue) using up-sampled Bayer CFA such as Quad Bayer, Nona pixel, and Tetra pixel, which are shown in FIG. 1.

Patterns of the up-sampled Bayer CFA are characterized by many different color interfaces per pixel. For example, a first pixel of the up-sampled Bayer CFA is green with neighbors red, blue, green, and green from the left, up, right, and bottom directions, respectively, while a second pixel has three (3) green neighbors and only one blue neighbor from the top. These interfaces' variability and the different color filter physical characteristics cause lights to stray inside the image sensor resulting in crosstalk. In image sensors, optical crosstalk (in particular, pixel crosstalk) may occur between neighboring when photons of some pixels pass to the neighboring pixels. Crosstalk makes poor color separation and its reduction may avoid color mixing.

SUMMARY

The disclosure is directed to extract multispectral information per image region from a super high-resolution image sensor with up-sampled Bayer pattern. This information can, in turn, be used for advanced features such as white balance and illumination reconstruction, health and material detection, precise color reconstruction, etc. The disclosure relates to a technical aspect that the crosstalk pattern is strongly linked to the spectral density of the incident light.

According to one aspect of the disclosure, an electronic device includes: at least one memory; a color filter array (CFA); an image sensor operatively connected to the CFA, the image sensor being configured to capture a plurality of M images respectively having a plurality of measured spectral densities in a plurality of D spectral bands; and at least one processor operatively connected to the at least one memory and the image sensor, wherein the at least one processor is configured to: measure a plurality of crosstalk values in a plurality of L pixels and in a plurality of K channels of the plurality of M images, wherein the K represents a number of pixels per a color of the CFA, estimate a plurality of spectral-crosstalk values by applying an estimation function to the plurality of crosstalk values, and control to store, in at least one of the at least one memory, the image sensor, or the at least one processor, the estimated plurality of spectral-crosstalk values.

According to one aspect of the disclosure, an electronic device includes: at least one memory storing a plurality of estimated spectral-crosstalk values; a color filter array (CFA); an image sensor operatively connected to the CFA, the image sensor being configured to receive an input image having a pattern of the CFA; and at least one processor operatively connected to the at least one memory and the image sensor, wherein the at least one processor is configured to: receive info on a first area of the input image, wherein the first area has a first crosstalk value, calculate the first crosstalk value in the first area of the input image, estimate a first spectral density of the first area by applying a pseudoinverse of the plurality of estimated spectral-crosstalk values to the calculated first crosstalk value, and control to store, in at least one of the at least one memory, the image sensor, or the at least one processor, the estimated first spectral density of the first area.

According to one aspect of the disclosure, an electronic device includes: at least one memory; a color filter array (CFA); an image sensor operatively connected to the CFA, the image sensor being configured to capture a plurality of M images respectively having a plurality of measured spectral densities in a plurality of D spectral bands; and at least one processor operatively connected to the at least one memory and the image sensor, wherein the at least one processor is configured to: measure a plurality of crosstalk values in a plurality of L pixels and in a plurality of K channels of the plurality of M images, wherein the K represents a number of pixels per a color of the CFA, estimate a plurality of spectral-crosstalk values by applying an estimation function to the plurality of crosstalk values, and control to store, in at least one of the at least one memory, the image sensor, or the at least one processor, the estimated plurality of spectral-crosstalk values, wherein the electronic device further comprises a flat detector operatively connected to the image sensor, wherein the at least one processor is further configured to: receive an input image having a pattern of the CFA, receive, from the flat detector, info on a first area of the input image, wherein the first area has a first crosstalk value, calculate the first crosstalk value in the first area of the input image, estimate a first spectral density of the first area by applying the pseudoinverse of the plurality of estimated spectral-crosstalk values to the calculated first crosstalk value, and control to store, in at least one of the at least one memory, the image sensor, or the at least one processor, the estimated first spectral density of the first area, and wherein the CFA is an up-sampled Bayer CFA.

BRIEF DESCRIPTION OF THE DRAWINGS

The above and other aspects, features, and aspects of certain embodiments of the disclosure will be more apparent from the following description taken in conjunction with the accompanying drawings, in which:

Figure 1:
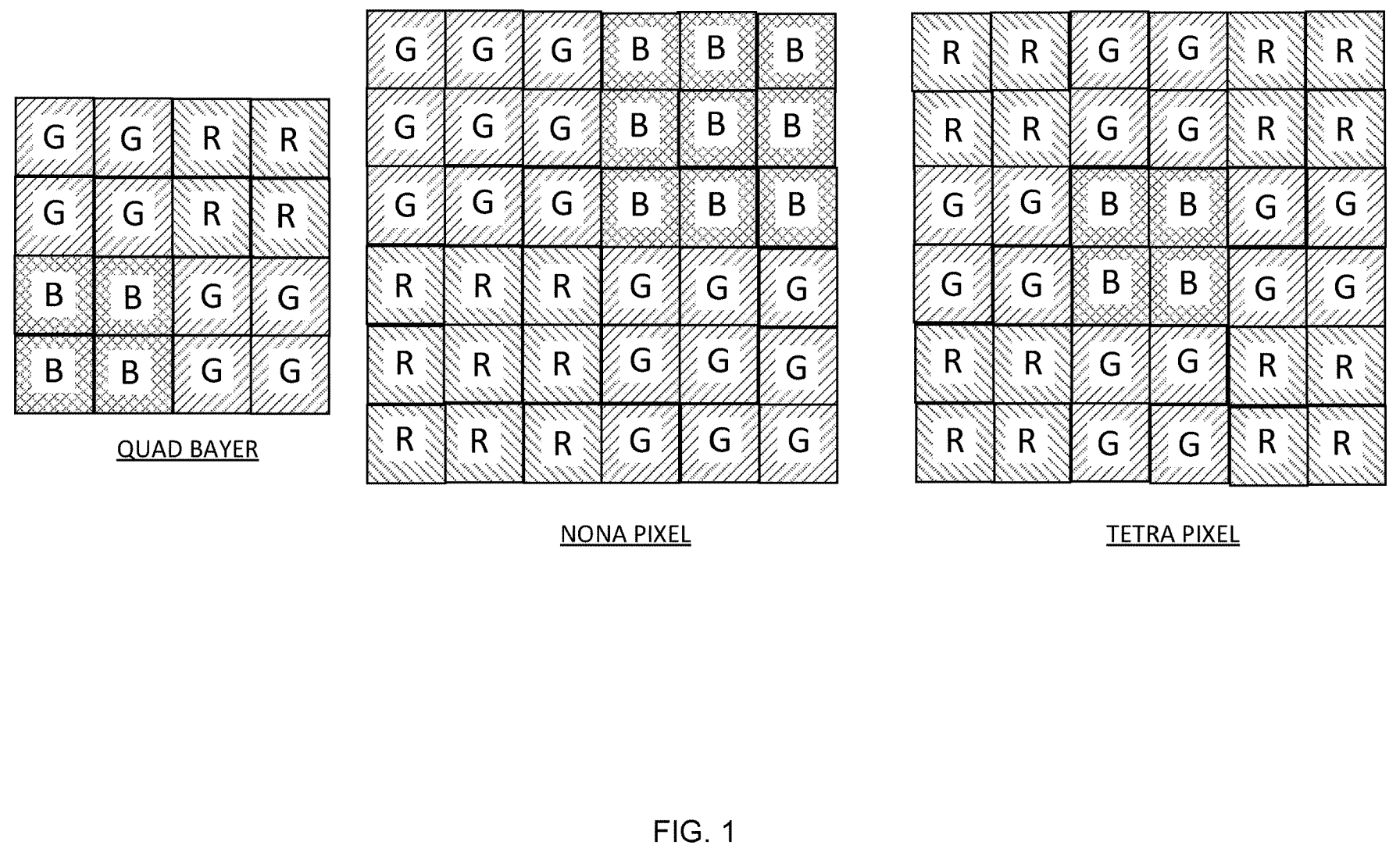

FIG. 1 illustrates examples of up-sampled Bayer Color Filter Array (CFA) (Quad Bayer, Nona pixel, and Tetra pixel);

FIG. 3 illustrates a Nona CFA pattern (left) and crosstalk (right) in the Nona CFA pattern;

FIG. 5 illustrates an example procedure for online spectrum reconstruction of a scene on an image sensor in accordance with some embodiments of the disclosure;

FIG. 6 illustrates a first set of operations performed by the electronic device in accordance with some embodiments of the disclosure; and FIG. 7 illustrates a second set of operations performed by the electronic device in accordance with some embodiments of the disclosure.

DETAILED DESCRIPTION

Figure 2:
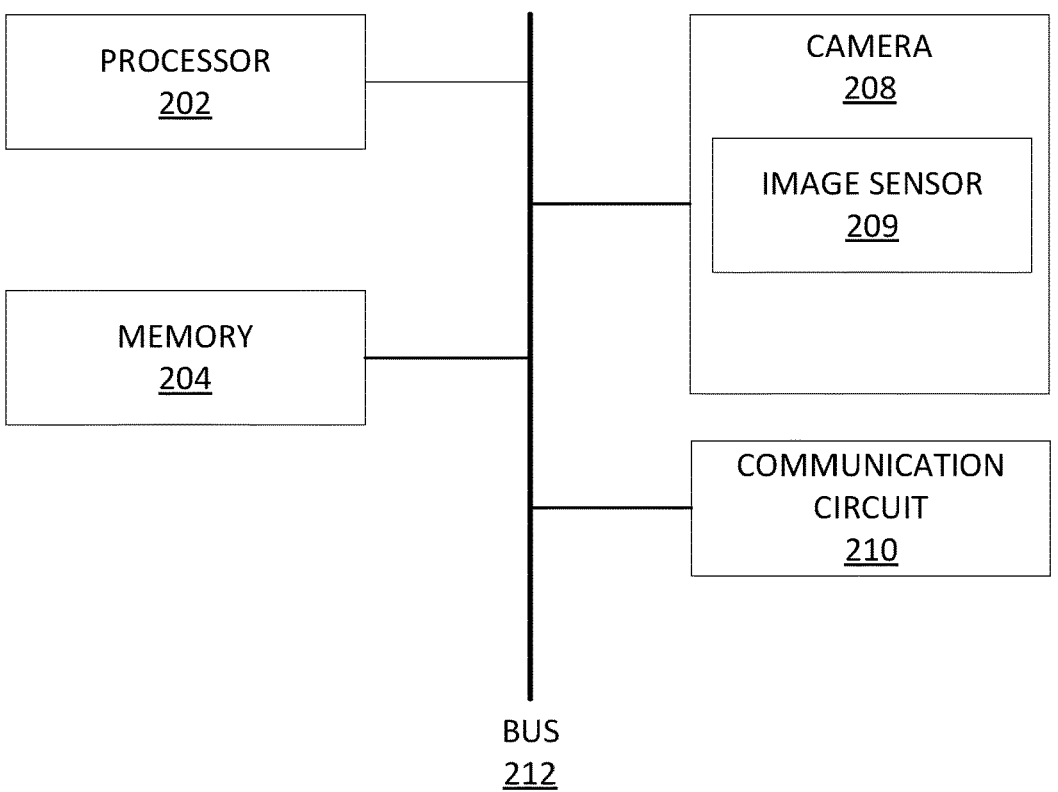
FIG. 2 illustrates example components of an electronic device in accordance with embodiments of the disclosure.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The electronic device according to one or more embodiments may be one of various types of electronic devices. In some embodiments of the disclosure, the electronic devices may include a portable communication device (e.g., a smartphone), a computer device, a portable multimedia device, a portable medical device, a camera, or a wearable device. The electronic devices are not limited to those described above, in accordance with some other embodiments of the disclosure.

The disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 illustrates example components of the electronic device in accordance with some embodiments of the disclosure.

As shown, the electronic device 200 may include at least one processor 202, at least one memory (at least one non-transitory computer-readable media) 204, an image sensor 106, a camera 208, a communication circuit 210, and a bus 212.

In an embodiment, the at least one processor 202 may be implemented in hardware, firmware, or a combination of hardware and software. The at least one processor 202 may be a central processing unit (CPU), a graphics processing unit (GPU), an application processor (AP), an accelerated processing unit (APU), a neural processing unit (NPU), a tensor processing unit (TCU), a microprocessor, a microcontroller, a digital signal processor (DSP), a field-programmable gate array (FPGA), an application-specific integrated circuit (ASIC), or another type of processing component. In an embodiment, the processor 202 may include one or more processors capable of being programmed to perform a function.

In an embodiment, the memory 204 may include a random access memory (RAM), a read only memory (ROM), or another type of dynamic or static storage device (e.g., a flash memory, a magnetic memory, and/or an optical memory) that stores information and/or instructions for use by the processor 202. In an embodiment, the memory 204 may contain information and/or software related to the operation and use of the electronic device 200. For example, the memory 204 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, or another type of non-transitory computer-readable medium, along with a corresponding drive.

In an embodiment, the camera 208 may include a lens or multiple lenses to capture an image of the object that is in close proximity to the electronic device. The camera 208 may be operatively connected with the processor 202, thus the processor 202 may control the camera 208, for example, based on software stored in the memory 204. In an embodiment, the camera 208 may produce signals or images that may be processed by the processor 202 and stored in the memory 204.

In an embodiment, the image sensor 209 may be included in the camera 208 or be separate from the camera 208. The image sensor 209 may receive external light via the lens or the multiple lenses.

In an embodiment, the communication circuit 210 may include a transceiver-like component (e.g., a transceiver and/or a separate receiver and transmitter) that enables the electronic device 200 to communicate with other devices, such as via a wired connection, a wireless connection, or a combination of wired and wireless connections. The communication circuit 210 may permit the electronic device 200 to receive information from another device and/or provide information to another device. For example, the communication circuit 210 may include an Ethernet interface, an optical interface, a coaxial interface, an infrared interface, a radio frequency (RF) interface, a universal serial bus (USB) interface, a Wi-Fi interface, a cellular network interface, or the like. In an embodiment, the communication circuit 210 may be a communication 'interface' used to connect the electronic device 200 with the other devices.

In an embodiment, the bus 212 may be a component that permits communication among the above-described components of the electronic device 200.

The number and arrangement of components shown in FIG. 1 are provided as an example. In an embodiment, the electronic device 200 may include additional components, fewer components, different components, or differently arranged components than those shown in FIG. 1. For example, although one processor 202 and one memory 204 are illustrated in FIG. 1 and described above, the at least one processor 202 and the memory 204 may be replaced with two or more processors and two or more memories, respectively.

Additionally or alternatively, a set of components (e.g., one or more components) of the electronic device 200 may perform one or more functions described as being performed by another set of components of the electronic device 200.

Some embodiments of the disclosure are directed to extract spectral data from an image. Crosstalk on an image sensor has a coherent dependency on the incoming light spectrum, crosstalk spectral calibration data of the image sensor may be available. A pre-calibration un-binned image may be available for analysis. A separation between the crosstalk and features may be available (e.g. via flat detection). That is, the image may have two regions: flat regions where the crosstalk is measurable and other (non-flat regions) having a lot of details (features), thus the crosstalk is not measurable.

Embodiments of the disclosure are based on detection of a crosstalk pattern per region in the image and transforming the crosstalk pattern from a crosstalk domain to a spectral domain by learning crosstalk spectral response in a calibration stage.

Image sensors may use up-sampled Bayer Color Filter Array (CFA) (Quad Bayer, Nona pixel, and Tetra pixel, as shown in FIG. 1) where neighboring pixels have same colors. For example, in some image sensors (such as the image sensor 209), there are unintended intensity disparities between adjacent pixels of the same color due to interactions between the lens optics, the physical color filters, the pixel structure, and the incoming light. This phenomenon, known as 'intra-channel disparity' or 'crosstalk,' may result in numerous image quality defects if not properly corrected. Crosstalk intensifies as pixel sizes shrink and camera designs become more complex. In a local CFA pattern, multiple, differently multiplexed samples of the same signal may be observed.

In FIG. 3, the left image shows a Nona CFA pattern, while the right image displays crosstalk in the Nona CFA pattern even though the incident signal is the same. Crosstalk can be measured in a relative uniform area of an image as neighboring pixels of the same color are compared to each other and differences of the neighboring pixels are calculated.

In FIG. 3, in the right side drawing ("Pixel crosstalk in Nona CFA pattern"), all the pixels may have crosstalk, that is, some pixels pass photons on and some other pixels receive the photons. In FIG. 3, the numbers indicate pixel intensity levels. The photons are converted to electrical charges that are next converted to a digital domain with code level usually between 0-1023.

For example, in FIG. 3, a first pixel with a value of 643 and a second pixel with a value of 632 (in left, upper 'Green') have "received" donor photons from the pixels in 'Blue' region. The pixels in 'Blue' region have "donated" their photons to the pixels in 'Red' and 'Green'. When the pixel levels are compared to either the Bayer level (an average of all pixels in the same color) or alternatively the center pixel (which may be most isolated from crosstalk) to understand what a 'real' pixel level is. In FIG. 3, the pixel levels in 'Blue' regions are higher than those in other regions (B>G>>R), which indicates that the pixels of 'Blue' region have donated their photons to the 'Red' region and the 'Green' region. In the related art, the influence of the light spectrum on crosstalk has been acknowledged, but measuring the light spectrum on crosstalk in real-time images has not been done. The distinctive architecture of the CFA pattern presents an opportunity to measure this artifact in relatively uniform image regions.

The disclosure is directed to exploit the interaction of optics (how the light is focused on the image sensor), the specifics of how the CFA samples light (local multiplexing), and the ability to measure the local multiplexing in real-time imaging (measurability) (i.e., measuring the different way the light is multiplexed) to reverse-engineer the effect, thereby learning information about the characteristics of the incoming light scene, specifically the incoming light spectrum.

A calibration process is performed by capturing featureless (not including details, in other words, flat) scenes (e.g., via an integrating sphere) at spectrally varied illuminations. As a non-limiting example, the integrating sphere is used in imaging which allows for the measurement of light with high accuracy with minimal interference from the directionality of the light. The integrating sphere is used to capture uniform images. There is a learned transform from the crosstalk to the spectral domain that is paired with the image sensor. In other embodiments, other methods may be used to capture uniform images.

In online operations (i.e., real time operations, which may occur after the calibration process is performed), once a patch in the image is examined, and a crosstalk signal of the image is separated, the calibrated transform on the crosstalk data is applied to output a spectral reconstruction using feature estimation methods. Non-limiting examples of the feature estimation methods are a linear transform method, a neural network method, and a dictionary based method.

In spectrum extraction operations, once the spectrum is calculated, the spectrum can be extracted from images generated by the image sensor by any acceptable methods such as dedicated mobile industry processor interface (MIPI) channel, embedded lines in the image, any other communication protocols. In some embodiments, the entire procedure or a part of the entire procedure of the disclosure may be performed on a processor (e.g., the processor 202) rather than on an image sensor (e.g., the image sensor 209) and make the spectral data available in a random access memory (e.g., the memory 204) for processing and capturing the next frame.

The disclosure is directed to reconstruct a multispectral image $H \in \mathbb{R}^{D \times L}$ from a crosstalk image $X \in \mathbb{R}^{K \times L}$ where L is a number of pixels. M is a number of images. Examples of the crosstalk images are calibration images, flat-field images, or captured images. N is a number of regions in the image. D is a number of spectral bands and K is a number of crosstalk channels in the CFA. Where each region is pretty large (e.g., 1/10th of the size of the image), an amount of the pixels is much larger than an amount of the regions.

Within a region ('n') of the multispectral image $n \in \{0, 1, \ldots, N\}$ where $N \ll L$, there is a 'spectral matrix,' which may be a linear transform, $S_n \in \mathbb{R}^{K \times D}$ that may project the multispectral image to the crosstalk image, such that:

$$S_n H_n = X_n \qquad \text{[Equation 1]}$$

In Equation 1, $H_n \in \mathbb{R}^{D \times L_n}$ and $X_n \in \mathbb{R}^{K \times L_n}$ are submatrices from the $L_n$ column from the multispectral image in which the spectral response of crosstalk may be constant.

In the calibration operation, the spectral matrix $S_n$ is estimated for all N regions by capturing M (calibration) images (e.g., flat-field images), for example, using the integrating light sphere configured to measure ground-truth spectrum densities, for example, using a spectroscope to solve the following Equation 2. Note that the calibration described herein is an example model or method. In other embodiments, $H_n$ may be an unknown function. An approximate model of the unknown function can be found using a neural network method.

$$\min_{S_n} \left\| S_n \tilde{H}_n - \tilde{X}_n \right\|^2 \qquad \text{[Equation 2]}$$

In Equation 2, $\tilde{H} \in \mathbb{R}^{D \times (L_n M)}$ wherein $\mathbb{R}^{D \times (L_n M)}$ is measured spectral density for all M (calibration) images and replicated along $L_n$ columns.

In Equation 2, $\tilde{X}_n \in \mathbb{R}^{K \times (L_n M)}$ wherein $\mathbb{R}^{K \times (L_n M)}$ are crosstalk measurements for all $L_n$ pixels in the region 'n' and the M (calibration) images.

If $H_n$ has a full-column rank (i.e., the matrix is made of fully independent columns), the minimization problem (Equation 2) is overdetermined and the minimization problem (Equation 2) may be solved by using least squares. An estimated calibration data $$S_{calib,n}\left( = \min_{S_n} \left\| S_n \tilde{H}_n - \tilde{X}_n \right\|^2 \right) \qquad \text{[Equation 2]}$$

is paired with a specific image sensor. In other words, the estimated calibration data $S_{calib,n}$ may be stored in an image sensor (e.g., the image sensor 209), a memory (e.g., the memory 204), or a processor (e.g., the processor 202 that may correspond to an application processor).

Figure 4:
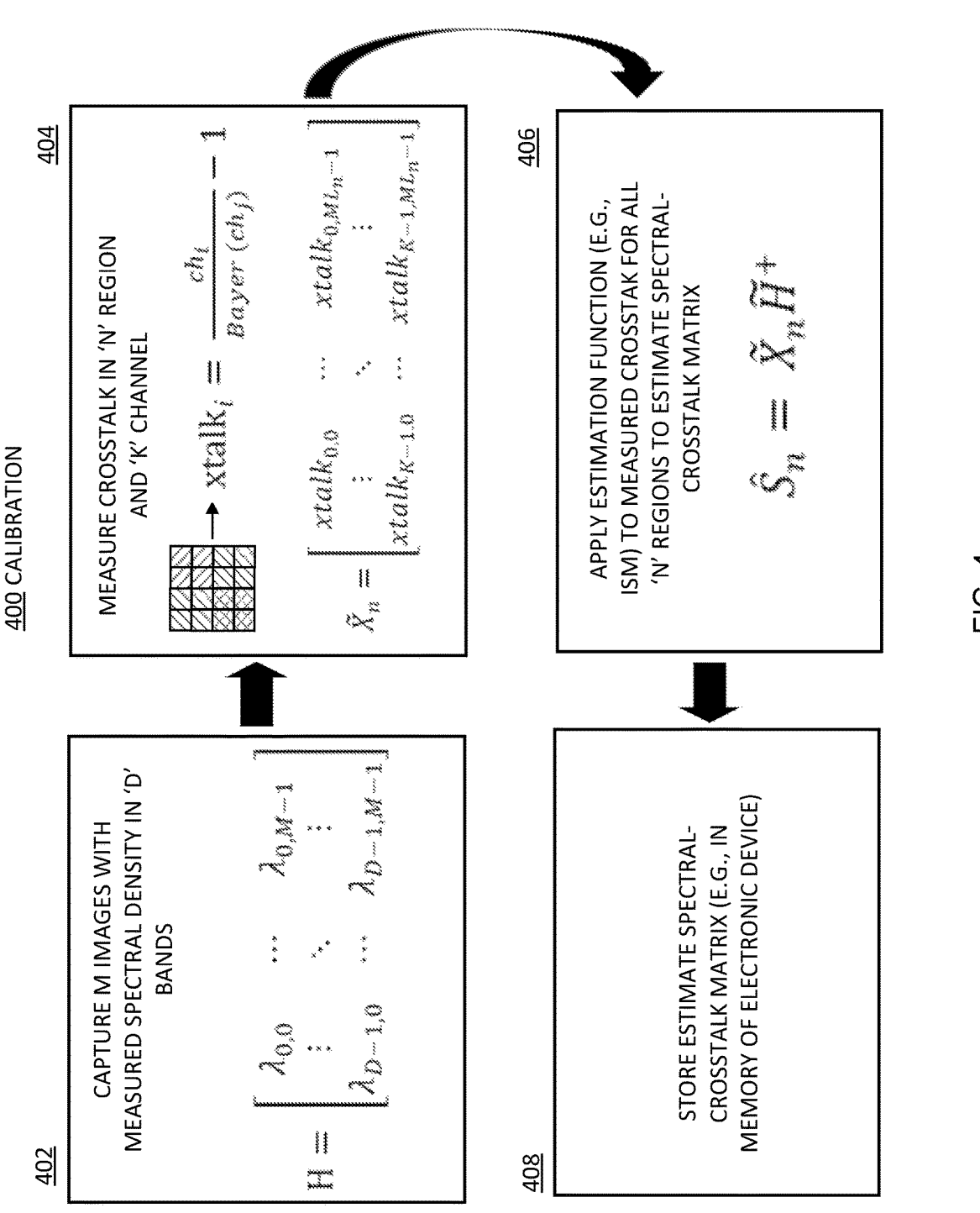
FIG. 4 illustrates an example procedure for calibration in accordance with some embodiments of the disclosure.

FIG. 4 illustrates an example procedure for the calibration 400.

In operation 402, M (calibration) images are captured by an image sensor (e.g., the image sensor 209) where the M (calibration) images have measured spectral densities. In an embodiment, the measured spectral densities are arranged in the spectral matrix $\tilde{H} \in \mathbb{R}^{D \times (L_n M)}$ that corresponds to the following matrix:

$$H = \begin{bmatrix} \lambda_{0,0} & \cdots & \lambda_{0,M-1} \\ \vdots & \ddots & \vdots \\ \lambda_{D-1,0} & \cdots & \lambda_{D-1,M-1} \end{bmatrix}$$

That is, in the above matrix, M (calibration) images are arranged with measured spectral densities of 'D' spectral bands.

In operation 404, crosstalk may be measured in each of $L_n$ pixels in the 'n' region and in 'K' (a number of pixels per color in a CFA pattern) channel of the 'M' calibration images. In an embodiment, the crosstalk may be measured as a deviation from a color average in each cell, given by the following equation:

$$xtalk_i = \frac{ch_i}{\frac{1}{K}\sum_{j=0,1\ldots} ch_j} - 1.$$

Here, $ch_i$ represents a pixel level in channel i, K represents a number of pixels per color in a CFA pattern; and $$\frac{1}{K}\sum_{j=0,1\ldots}$$

$ch_j$ represents an average pixel level of all pixels of a same color (e.g., a Bayer image pixel level) which can be notated as Bayer $(ch_i)$, as below $$xtalk_i = \frac{ch_i}{\text{Bayer } (ch_i)} - 1$$

$$\tilde{X}_n = \begin{bmatrix} xtalk_{0,0} & \cdots & xtalk_{0,ML_n-1} \\ \vdots & \ddots & \vdots \\ xtalk_{K-1,0} & \cdots & xtalk_{K-1,ML_n-1} \end{bmatrix}$$

In operation 406, an estimation function, for example, an inverse of spectral matrix $\tilde{H}(\in \mathbb{R}^{D \times (L_n M)}$, is applied to the crosstalk measurements, in order to estimate the spectral-crosstalk matrix: $\hat{S}_n = \tilde{X}_n \tilde{H}^+$. That is, the estimation function for all 'N' regions may be calculated and be applied to estimate the spectral-crosstalk matrix $(\hat{S}_n)$. Non-limiting examples of the estimation functions are neural network models.

In a stage (e.g., the real time application or the online operation, which occurs after the calibration stage is completed), a reconstruction of the multispectral image H is tried on each frame of an image generated by the image sensor. In an embodiment, an input image, though a flat detector, is first processed as the crosstalk measurements $(X_n)$ may be valid in uniform regions of the input image. After the crosstalk measurements $(X_n)$ are obtained, the minimization problem (Equation 2) may be solved:

$$\min_{H_n} \left\| S_{calib,n} H_n - X_n \right\|^2 + \sum \lambda_i P_i(H_n) \qquad \text{[Equation 3]}$$

In Equation 3, $P_i(H_n)$ represent 'priors' such as physically plausible requirements on the spectral density: non-negative values, total power density totaling one (1), spectral correlation, and sparsity. If not employing any priors, the problem (Equation 3) reduces down to a simple least-squares solution:

$$\hat{H}_n = S^+_{calib,n} X_n \qquad \text{[Equation 4]}$$

The pseudoinverse of $S_{calib,n}$, which is $$S^+_{calib,n},$$

may be calculated in an offline operation and be used in the above 'Equation 4' during run time. In the disclosure, $S_n$ denotes a general model of the spectral matrix; $\hat{S}_n$ denotes a calculated or estimated spectral matrix; $S_{calib,n}$ denotes a stored spectral matrix, which is estimated in the calibration operation;

$$S_{calib,n}^{+}$$

denotes a pseudoinverse of $S_{calib,n}$.

A specific number of spectral bands D may be determined by examining the dimensionality of the crosstalk on a specific image sensor. For example, in a scenario where there are 36 crosstalk channels, the optimal D bands may be ten (10).

In operation 408, the calculated spectral matrix, $\hat{S}_n = \tilde{X}_n \tilde{H}^+$, may be stored in a memory (e.g., the memory 204) of an electronic device (e.g., the electronic device 200). In some embodiments, the calculated spectral matrix, $\hat{S}_n = \tilde{X}_n \tilde{H}^+$, may be stored in other components, such as an image sensor (e.g., the image sensor 209) or a processor (e.g., the processor 202).

FIG. 5 illustrates an example procedure for online spectrum reconstruction of a scene on an image sensor (e.g., the image sensor 209) by using the crosstalk measured in the image, which is combined with the stored estimated plurality of spectral-crosstalk values obtained in operation 408 of the calibration 400. The following operations may be performed by components of the electronic device 200, such as the image sensor 209, the processor 202, or any combinations of those components.

In operation 502, an input image (having a CFA pattern) is provided to each frame on the image sensor 209. In an embodiment, the image sensor 209 may receive or obtain the input image from components of the electronic device 200 such as the processor 202, the memory 204, or any combinations of those components. In an embodiment, the image sensor 209 may capture the input image. In an embodiment, the image sensor 209 may receive or obtain the input image from outside the electronic device 200.

In operation 504, areas or regions (at least one area or region) of the input image (having the same CFA pattern as the calibration images) (where crosstalk can be measured) are determined. Note that the calibrated $S_{calib,n}$ is obtained in each general area (e.g., top-left of the image). For example, a flat detector, which may be a set of operations or algorithms performed by the image sensor 209 or the processor 202 works per pixel to determine if the pixel is in a flat patch of the image, thus the estimate of the spectrum is per pixel if said pixel is in a flat patch of the image. Thus, a local spectral estimation (per pixel resolution) may be obtained in flat areas. Or, the local spectral estimations are aggregated for a more robust estimation.

In operation 506, crosstalk (e.g., a plurality of crosstalk values) is calculated in the (valid) areas (e.g., marked as 'flat' by the flat detector) by measuring a deviation of each channel in the CFA pattern from the above described Bayer level, Bayer ($ch_i$):

$$xtalk_i = \frac{ch_i}{Bayer\ (ch_i)} - 1.$$

In operation 508, a pseudoinverse of the spectral matrix $$\left(S_{calib,n}^{+}\right),$$

which was stored in the above described calibration operations (e.g., operation 408), is applied on all the calculated crosstalk ($X_n$) of the pixels in order to estimate spectrum density expressed as in the below Equation 5:

$$\hat{H}_n = S_{calib,n}^{+} X_n \qquad \text{[Equation 5]}$$

Alternatively, because the crosstalk can be calculated in pixels, when x, y are belonging to a flat patch in an image, the region 'n' in the above Equation 5 may be replaced with (x,y), thus Equation 5 is also denoted as:

$$\hat{H}_{(x,y)} = S_{calib,(x,y)}^{+} X_{(x,y)}$$

In operation 510, the estimated spectral density ($\hat{H}_n$) may be acquired.

In operation 512, the estimated spectral density (An) correspond to local spectral estimates, which may be aggregated for a global spectrum estimate. In some embodiments, the local spectral estimates may be utilized for high resolution applications.

The embodiments of the disclosure may be applied electronic devices including a camera (e.g., the electronic device 200 including the camera 208) to obtain spectral information from a scene without a need for a dedicated sensor, which would make the acquisition process much cheaper and more streamlined. In addition, the spectral information is aligned to the captured image since both of the spectral information and the captured image are taken using a same frame on a same image sensor of the camera.

Then, such (estimated) spectral data may be used for the following example systems: (1) illumination estimation (which is used for auto-white balance applications) is improved when using spectral data due to the extended wavelength range and higher spectral resolution which can give a more precise assessment of light sources and their spectral distribution; (2) material detection, known as spectroscopy, is done by analyzing the unique spectral signatures materials leave in the form of light absorption, emission, or scattering at different wavelengths; (3) precise color reconstruction and wide color gamut as spectral data represents a larger portion and more precise recording of the visible spectrum; and (4) health features where spectral imaging can identify substances in biological samples or even detect changes in tissue that may indicate disease by analyzing their spectral signatures.

FIG. 6 illustrates a first set of operations performed by the electronic device 200 in accordance with some embodiments of the disclosure.

In operation 600, the image sensor 209 is configured to capture a plurality of 'M' images respectively having a plurality of measured spectral densities in a plurality of 'D' spectral bands. In an embodiment, the plurality of measured spectral densities are arranged in a spectral matrix. Operation 600 may correspond to operation 402 of FIG. 4, which is described above.

In operation 602, the image sensor 209 is configured to measure a plurality of crosstalk values in a plurality of 'L' pixels and in a plurality of 'K' channels of the plurality of 'M' images. Here the 'K' represents a number of pixels per a color of the CFA. In an embodiment, the CFA is the up-sampled Bayer CFA, for example, the CFAs shown in FIG. 1, Operation 602 may correspond to operation 404 of FIG. 4, which is described above.

In operation 604, the image sensor 209 is configured to estimate a plurality of spectral-crosstalk values by applying an estimation function to the plurality of crosstalk values. Operation 604 may correspond to operation 406 of FIG. 4, which is described above. In an embodiment, the estimation function corresponds to a pseudoinverse of the spectral matrix. In an embodiment, the estimation function corresponds to a neural network model.

In operation 606, the image sensor 209 is configured to store, in at least one of the memory, the image sensor, or the processor, the estimated plurality of spectral-crosstalk values. Operation 606 may correspond to operation 408 of FIG. 4, which is described above.

FIG. 7 illustrates a second set of operations (online spectral reconstruction 500) performed by the electronic device 200 in accordance with some embodiments of the disclosure.

In operation 700, the image sensor is configured to receive an input image having a pattern of the CFA. Operation 700 may correspond to operation 502 of FIG. 5, which is described above.

In operation 702, the image sensor is configured to receive, from the flat detector, info on a first area of the input image, wherein the first area has a first crosstalk value. Operation 702 may correspond to operation 504 of FIG. 5, which is described above.

In operation 704, the image sensor is configured to calculate the first crosstalk value in the first area of the input image. Operation 704 may correspond to operation 506 of FIG. 5, which is described above.

In operation 706, the image sensor is configured to estimate a first spectral density of the first area by applying a pseudoinverse of the plurality of estimated spectral-crosstalk values to the calculated first crosstalk value. Operation 706 may correspond to operation 508 of FIG. 5, which is described above.

In operation 708, the image sensor is configured to store, in at least one of the memory, the image sensor, or the processor, the estimated first spectral density of the first area. Operation 708 may correspond to operation 510 of FIG. 5, which is described above.

In an embodiment, the image sensor is further configured to receiving, from the flat detector, info on a second area of the input image, wherein the second area has a second crosstalk value. Then, the image sensor is further configured to repeat the above operations to obtain an estimated second spectrum density of the second area. The image sensor is further configured to generate a global spectral density estimate of the input image by aggregating the estimated first spectral density of the first area and the estimated second spectral density of the second area.

One or more embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to one or more embodiments, in a non-volatile storage medium storing instructions, the instructions may be configured to, when executed by at least one processor 202, cause the at least one processor 202 to perform at least one operation. The at least one operation may include displaying an application screen of a running application on a display, identifying a data input field included in the application screen, identifying a data type corresponding to the data input field, displaying at least one external electronic device, around the electronic device, capable of providing data corresponding to the identified data type, receiving data corresponding to the identified data type from an external electronic device selected from among the at least one external electronic device through a communication circuit, and entering the received data into the data input field.

The embodiments of the disclosure described in the present specification and the drawings are only presented as specific examples to easily explain the technical content according to the embodiments of the disclosure and help understanding of the embodiments of the disclosure, not intended to limit the scope of the embodiments of the disclosure. Therefore, the scope of one or more embodiments of the disclosure should be construed as encompassing all changes or modifications derived from the technical spirit of one or more embodiments of the disclosure in addition to the embodiments disclosed herein.

What is claimed is:

1. An electronic device comprising:

at least one memory;

a color filter array (CFA);

an image sensor operatively connected to the CFA, the image sensor being configured to capture a plurality of M images respectively having a plurality of measured spectral densities in a plurality of D spectral bands; and at least one processor operatively connected to the at least one memory and the image sensor, wherein the at least one processor is configured to:

measure a plurality of crosstalk values in a plurality of L pixels and in a plurality of K channels of the plurality of M images, wherein the K represents a number of pixels per a color of the CFA, estimate a plurality of spectral-crosstalk values by applying an estimation function to the plurality of crosstalk values, and control to store, in at least one of the at least one memory, the image sensor, or the at least one processor, the estimated plurality of spectral-crosstalk values.

2. The electronic device of claim 1, wherein the CFA is an up-sampled Bayer CFA.

3. The electronic device of claim 1, wherein the CFA is Quad Bayer, Nona pixel, or Tetra pixel.

4. The electronic device of claim 1, wherein the estimation function corresponds to a pseudoinverse of a spectral matrix or a neural network model.

5. The electronic device of claim 4, wherein the plurality of measured spectral densities are arranged in the spectral matrix.

6. The electronic device of claim 1, wherein the at least one processor is further configured to measure the plurality of crosstalk values in the plurality of L pixels and in the plurality of K channels of the plurality of M images, based on a plurality of deviations between pixel levels of the plurality of L pixels and average color values of the plurality of K channels.

7. The electronic device of claim 1, wherein the at least one processor is further configured to capture the plurality of M images using an integrating light sphere configured to measure ground-truth spectral densities of the plurality of M images.

8. An electronic device comprising:

at least one memory;

a color filter array (CFA);

an image sensor operatively connected to the CFA, the image sensor being configured to capture a plurality of M images respectively having a plurality of measured spectral densities in a plurality of D spectral bands; and at least one processor operatively connected to the at least one memory and the image sensor, wherein the at least one processor is configured to:

measure a plurality of crosstalk values in a plurality of L pixels and in a plurality of K channels of the plurality of M images, wherein the K represents a number of pixels per a color of the CFA, estimate a plurality of spectral-crosstalk values by applying an estimation function to the plurality of crosstalk values, and control to store, in at least one of the at least one memory, the image sensor, or the at least one processor, the estimated plurality of spectral-crosstalk values, wherein the electronic device further comprises a flat detector operatively connected to the image sensor, wherein the at least one processor is further configured to:

receive an input image having a pattern of the CFA, receive, from the flat detector, info on a first area of the input image, wherein the first area has a first crosstalk value, calculate the first crosstalk value in the first area of the input image, estimate a first spectral density of the first area by applying the pseudoinverse of the plurality of estimated spectral-crosstalk values to the calculated first crosstalk value, and control to store, in at least one of the at least one memory, the image sensor, or the at least one processor, the estimated first spectral density of the first area, and wherein the CFA is an up-sampled Bayer CFA.

9. The electronic device of claim 8, wherein the at least one processor is further configured to:

receive, from the flat detector, info on a second area of the input image, wherein the second area has a second crosstalk value, calculate the second crosstalk value in the second area of the input image, estimate a second spectral density of the second area by applying a pseudoinverse of the plurality of estimated spectral-crosstalk values to the calculated first crosstalk value, control to store, in at least one of the at least one memory, the image sensor, or the at least one processor, the estimated second spectral density of the second area, and generate a global spectral density estimate of the input image by aggregating the estimated first spectral density of the first area and the estimated second spectral density of the second area.

10. The electronic device of claim 8, wherein the CFA is Quad Bayer, Nona pixel, or Tetra pixel.

11. The electronic device of claim 8, wherein the at least one processor is further configured to measure the plurality of crosstalk values in the plurality of L pixels and in the plurality of K channels of the plurality of M images, based on a plurality of deviations between pixel levels of the plurality of L pixels and average color values of the plurality of K channels.

12. The electronic device of claim 8, wherein the at least one processor is further configured to capture the plurality of M images using an integrating light sphere configured to measure ground-truth spectral densities of the plurality of M images.

* * * * *